(12) United States Patent
Yamamoto

(10) Patent No.: US 7,433,547 B2
(45) Date of Patent: Oct. 7, 2008

(54) IMAGE SIGNAL PROCESSING APPARATUS

(75) Inventor: Toshinori Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 10/869,577

(22) Filed: Jun. 16, 2004

(65) Prior Publication Data

US 2004/0257451 A1    Dec. 23, 2004

(30) Foreign Application Priority Data

Jun. 20, 2003   (JP)   ............... 2003-176994

(51) Int. Cl.
  *G06K 9/03*   (2006.01)
(52) U.S. Cl. .................. 382/309; 345/427; 399/167
(58) Field of Classification Search ......... 382/309–311; 355/27; 399/167; 345/660
  See application file for complete search history.

(56) References Cited

U.S. PATENT DOCUMENTS

| | | | |
|---|---|---|---|
| 5,396,286 A | | 3/1995 | Ishizuka |
| 5,497,192 A | | 3/1996 | Ishizuka |
| 5,764,871 A | * | 6/1998 | Fogel .................. 345/427 |
| 5,838,837 A | * | 11/1998 | Hirosawa et al. .......... 382/284 |
| 5,883,663 A | * | 3/1999 | Siwko .................. 348/87 |
| 6,288,756 B1 | | 9/2001 | Shiota et al. |
| 6,337,951 B1 | | 1/2002 | Nakamura |
| 6,397,334 B1 | | 5/2002 | Chainer et al. |
| 6,407,747 B1 | * | 6/2002 | Chui et al. ............. 345/660 |
| 7,050,098 B2 | | 5/2006 | Shirakawa et al. |
| 7,106,370 B2 | | 9/2006 | Shiomi et al. |
| 2001/0021008 A1 | * | 9/2001 | Matama .............. 355/27 |
| 2002/0003973 A1 | * | 1/2002 | Saito .................. 399/167 |
| 2003/0020819 A1 | | 1/2003 | Fukuda |

FOREIGN PATENT DOCUMENTS

| | | |
|---|---|---|
| CN | 1173778 | 2/1998 |
| CN | 1188956 | 7/1998 |
| EP | 0 920 179 A2 | 6/1999 |

(Continued)

OTHER PUBLICATIONS

European Patent Office; "European Search Report"; of corresponding European Patent Application No. EP 04 25 0697; date of mailing Mar. 24, 2005; (4 pages).

(Continued)

*Primary Examiner*—Brian Q Le
*Assistant Examiner*—Tsung-Yin Tsai
(74) *Attorney, Agent, or Firm*—Morgan & Finnegan, LLP

(57) ABSTRACT

An object of the invention is to greatly downsize the physical circuit size by achieving balance correction between the divided areas of an image sensing area by a digital signal process for A/D-converted digital data from a CCD. There is provided an image signal processing apparatus characterized by including an image sensing device which has an image sensing area divided into a plurality of areas, generates image signals in the divided areas, and outputs the image signals, a balance correction device which corrects the balance between the image signals of digital values from the divided areas, a synthesis device which synthesizes the image signals of the divided areas to generate one image data, and a defect correction device which corrects a defect of the image signal synthesized by the synthesis device.

2 Claims, 10 Drawing Sheets

FOREIGN PATENT DOCUMENTS

| | | |
|---|---|---|
| JP | 09-046599 | 2/1997 |
| JP | 2001-086394 | 3/2001 |
| JP | 2002-142158 | 5/2002 |
| JP | 2002-268624 | 9/2002 |
| JP | 2002-2686624 | 9/2002 |
| JP | 2002-300477 | 10/2002 |
| JP | 2002-320142 | 10/2002 |
| JP | 2003-046876 | 2/2003 |

OTHER PUBLICATIONS

Boukraa et al.; "Tag-Based Vision: Assisting 3D Scene Analysis with Radio-Frequency Tags"; IEEE; XP010595150; Information Fusion 2002; Proceedings of the Fifth International Conference; Jul. 8, 2002; (pp. 412-418).

* cited by examiner

IMAGE SIGNAL PROCESSING APPARATUS

FIELD OF THE INVENTION

The present invention relates to an image signal processing technique and, more particularly, to a technique of processing image signals from a plurality of areas divided from the image sensing area.

BACKGROUND OF THE INVENTION

Japanese Patent Laid-Open No. 9-46599 discloses a solid-state image sensing apparatus which compares the integral values of outputs from CCDs on two channels and corrects their output gains so as to make the integral values equal to each other.

The conventional method executes level correction between two channels in an analog circuit. This tends to increase the physical circuit size.

SUMMARY OF THE INVENTION

It is an object of the present invention to provide a technique of greatly downsizing the physical circuit size by achieving level correction between two channels, synthesis of the frames of the two channels, correction of a CCD defect, and/or correction of a barycentric shift by a digital signal process for A/D-converted digital data from a CCD.

To achieve the above object, according to the first aspect of the present invention, an image signal processing apparatus comprises an image sensing device which has an image sensing area divided into a plurality of areas, generates image signals in the divided areas, and outputs the image signals, a balance correction device which corrects balance between the image signals of digital values from the divided areas, a synthesis device which synthesizes the image signals of the divided areas to generate one image data, and a defect correction device which corrects a defect of the image signal synthesized by the synthesis device.

According to the second aspect of the present invention, an image signal processing apparatus comprises an image sensing device which has an image sensing area divided into a plurality of areas, generates color image signals in the divided areas, performs vertical addition of a same color for image signals in the divided areas, and outputs the image signals, an A/D conversion device which converts the image signals output from the image sensing device from analog values into digital values, and a barycentric shift correction device which corrects a barycentric shift of a pixel position, that is caused by the vertical addition of the same color, by weighting and adding the image signals of the digital values together with preceding and succeeding pixels on a same vertical line.

The present invention can greatly reduce the physical circuit size by digitally performing a process of converting the image signals of divided areas output from the image sensing device into digital values and then correcting the balance between the image signals of the divided areas, a process of synthesizing the image signals of the divided areas, and/or a process of correcting a defect of the image signal.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described below.

First Embodiment

Figure 1:
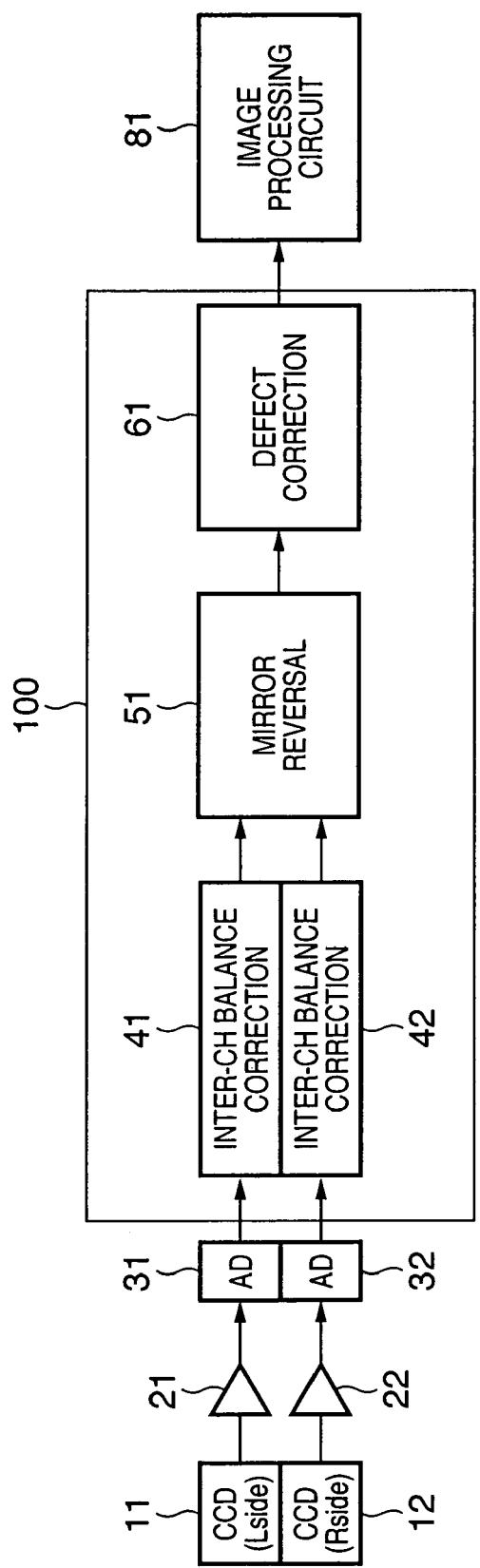
FIG. 1 is a block diagram showing an image signal digital processing apparatus according to the first embodiment of the present invention.

FIG. 1 is a block diagram showing an image signal processing apparatus according to the first embodiment of the present invention. In FIG. 1, reference numerals 11 and 12 denote CCDs (image sensing means) which generate image signals by photoelectric conversion and output them. Multi-pixel CCDs have recently been implemented. To utilize a CCD output image from such multi-pixel CCD as a moving image, CCD output signals must be read out from all pixels at high speed because of a very large number of pixels. It is, however, difficult to realize this by extension of a conventional device technique. Thus, there is proposed a CCD in which a horizontal CCD is divided into two and one frame is read out from two output terminals.

The CCDs 11 and 12 in FIG. 1 are of two-divided output type. The CCD 11 provides an output from the left image area (image sensing area) of the frame, and the CCD 12 provides an output from its right image area. Reference numerals 21 and 22 denote amplifiers for amplifying the left and right CCD outputs of the frame. The amplifier 21 amplifies an output from the left image area of the frame, and the amplifier 22 amplifies an output from its right image area. Reference numerals 31 and 32 denote A/D converters for converting the left and right CCD outputs of the frame from analog values into digital values. The A/D converter 31 converts an output from the left image area of the frame, and the A/D converter 32 converts an output from the right image area. Reference numerals 41 and 42 denote inter-channel balance correction circuits for correcting the output balance between the left and right CCD outputs of the frame.

A two-divided output type CCD such as the CCDs 11 and 12 is advantageous in read speed, but disadvantageous in output level matching. Thus, the left and right outputs of the frame are corrected by the inter-channel balance correction circuits 41 and 42. Reference numeral 51 denotes a mirror reversal circuit (synthesis circuit) for performing array conversion and synthesizing two divided output signals so as to process them as one image signal by subsequent circuits. Reference numeral 61 denotes a defect correction circuit for correcting the output defect of an output pixel at a defective portion unique to an individual CCD. The blocks 41, 42, 51, and 61 form a block 100 representing an image signal processing circuit in the first embodiment. An image signal having undergone a series of image signal processes is transferred to an image processing circuit 81, subjected to a necessary image process such as an electronic zoom process on the apparatus system side, and then utilized.

The operation of the block 100 representing the image signal processing circuit in the first embodiment will be described in detail.

Figure 2:
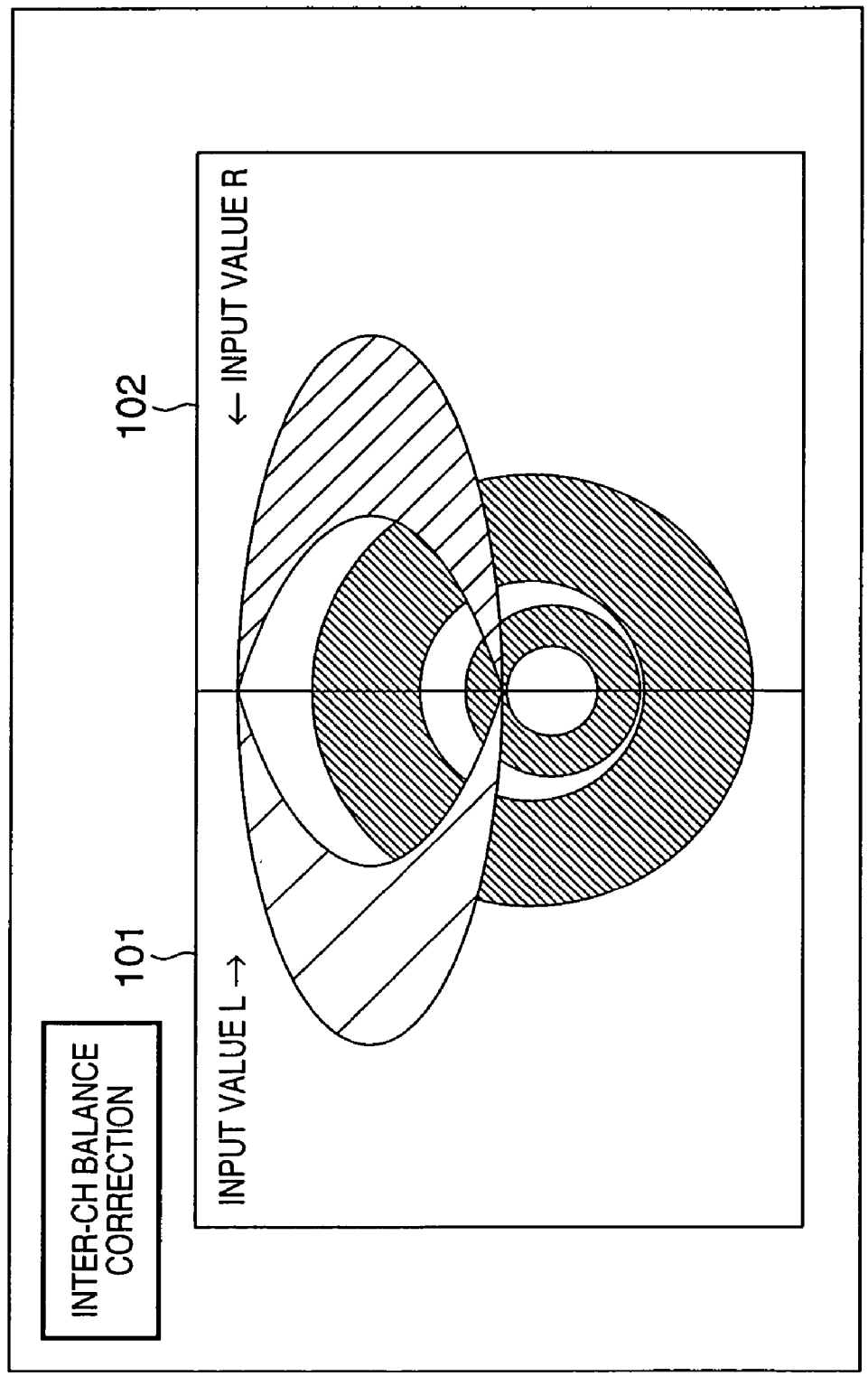
FIG. 2 is a view showing the visual state of an output screen monitor for raw data.
Figure 6:
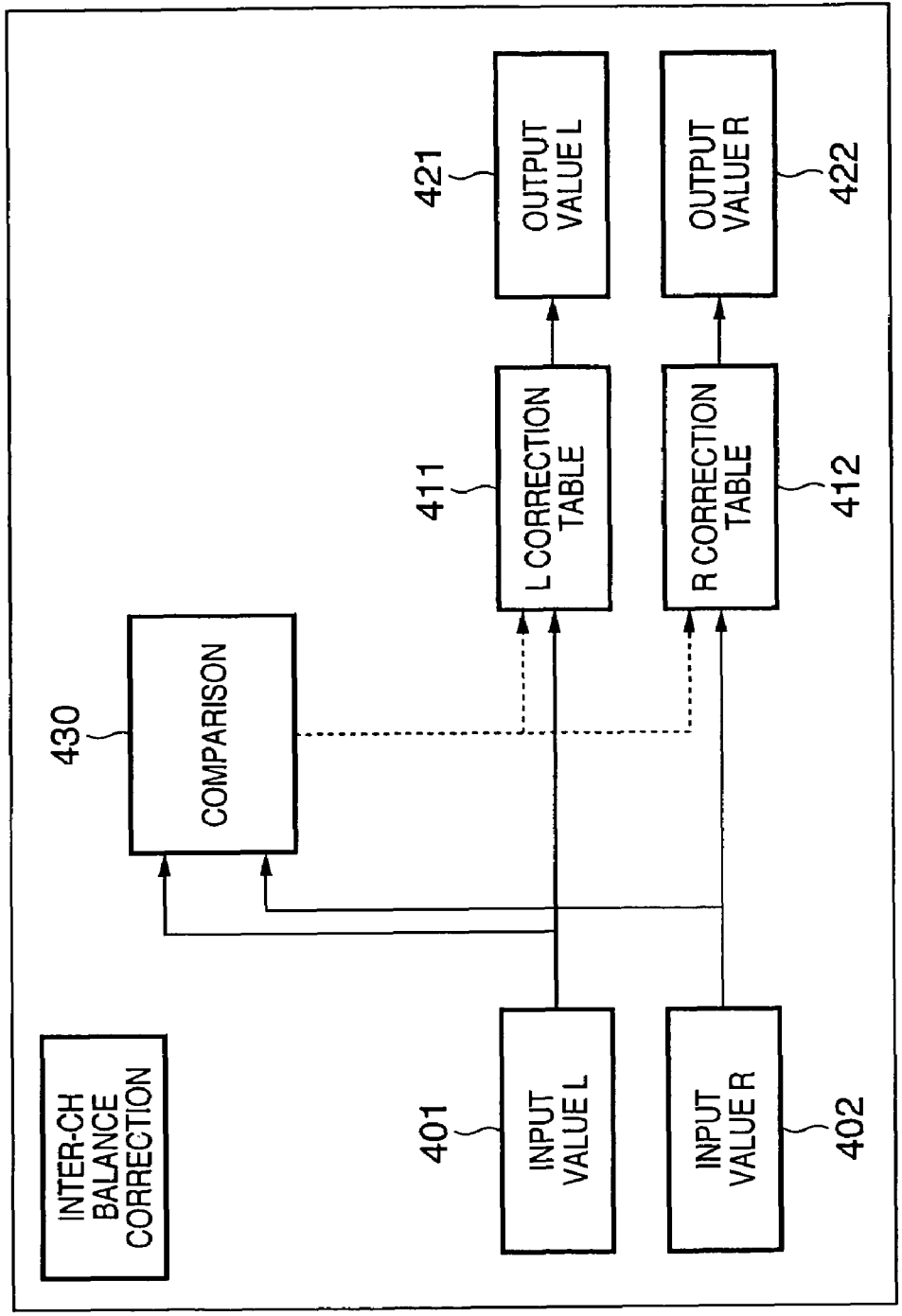
FIG. 6 is a block diagram showing an inter-channel balance correction circuit in the first embodiment.

FIG. 2 shows the visual state of an output screen monitor when left and right converted digital image data from the A/D converters 31 and 32 shown in FIG. 1 are still raw data. When a flat color object symmetrical on the frame exists, output levels from left and right CCDs have a difference. The color level difference clearly appears on the frame without executing any correction. Left digital image data 101 of the frame is image data corresponding to an output signal from the left CCD 11. Right digital image data 102 of the frame is image data corresponding to an output signal from the right CCD 12. The image data 101 and 102 are different in level. To prevent this visual state, the inter-channel balance correction circuits 41 and 42 in FIG. 1 are constructed as shown in FIG. 6. Left and right image data of the frame supplied to input terminals 401 and 402 are input to a comparison circuit 430. The comparison circuit 430 compares the data to select left and right different correction tables 411 and 412 for absorbing the difference. The input values at the input terminals 401 and 402 are converted on the basis of the left and right different correction tables 411 and 412 so as to absorb the difference. The converted data are output to output terminals 421 and 422.

The inter-channel balance correction circuits 41 and 42 in FIG. 6 process the left and right image data strings of the frame while these strings are arranged temporally serially. The image data amount processed at once by each circuit decreases, and the circuit is downsized.

Figure 3:
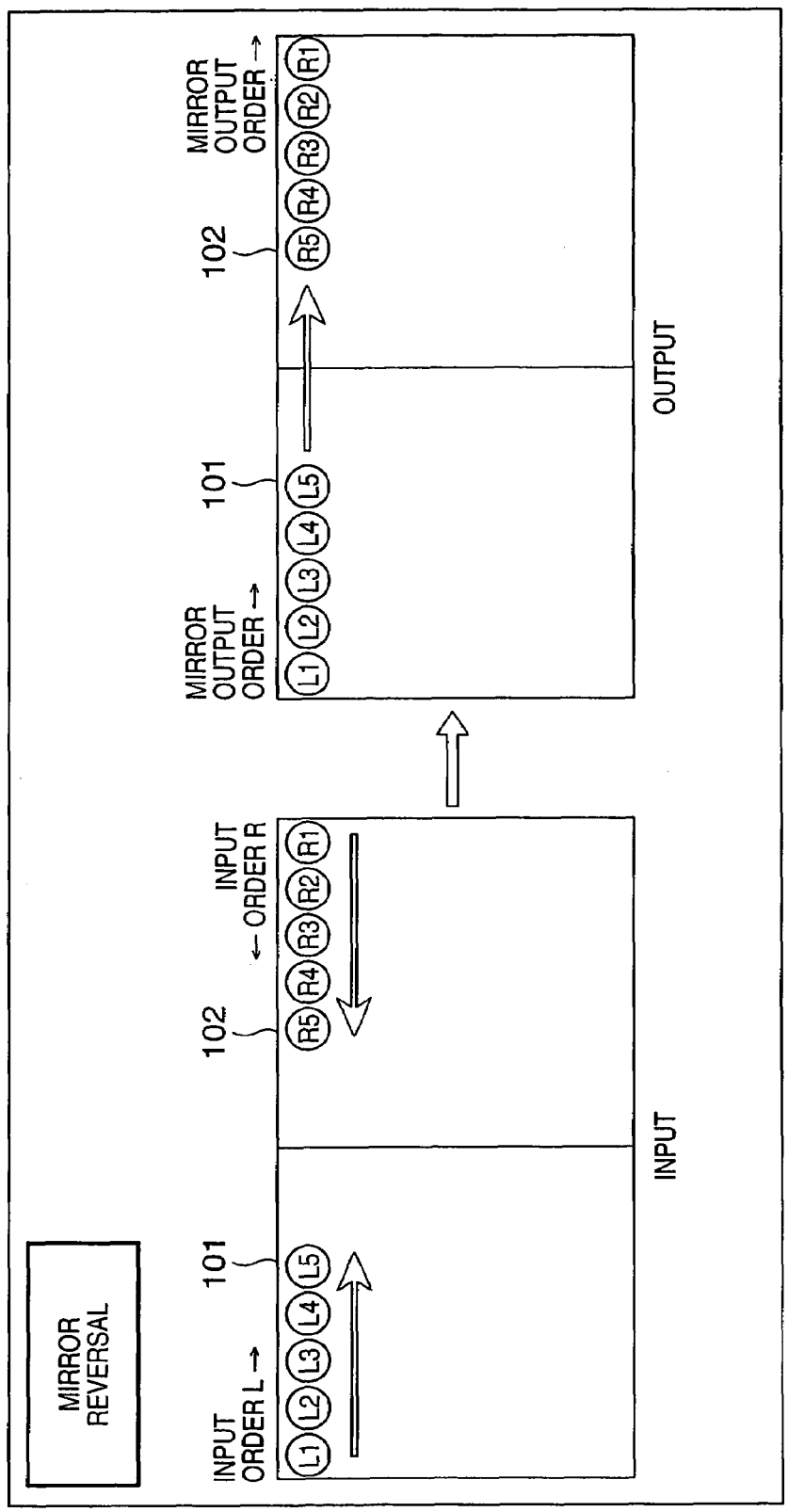
FIG. 3 is a schematic view showing the data array conversion method of a mirror reversal circuit in the first embodiment.

Data after correction of matching between left and right output data by the inter-channel balance correction circuits 41 and 42 in FIG. 1 undergo array conversion by the mirror reversal circuit 51 in FIG. 1 so as to process the data as one image signal. FIG. 3 schematically shows data array conversion in the first embodiment. The order of data input in order of time, i.e., data on the left side of FIG. 3 such as an input value L1 from the L-side inter-channel balance correction circuit 41 in FIG. 1, an input value R1 from the R-side inter-channel balance correction circuit 42, an input value L2 from the L-side inter-channel balance correction circuit 41, an input value R2 from the R-side inter-channel balance correction circuit 42, ... is converted so that signals on one row of the frame are read out sequentially from a left pixel on the frame, as shown on the right side of FIG. 3. In other words, a data string whose input order is L1, R1, L2, R2, L3, R3, ... is converted into an output order of L1, L2, L3, ..., R3, R2, and R1 in read. The left image data 101 of the frame contains data L1, L2, and L3. The right image data 102 of the frame contains data R1, R2, and R3. As is apparent from FIG. 3, of data strings sequentially written from the left and right ends of the frame, a data string on the right side of the frame has a mirror-reflected output order with reference to the input order. For this reason, the circuit 51 is called a "mirror reversal circuit".

Figure 7:
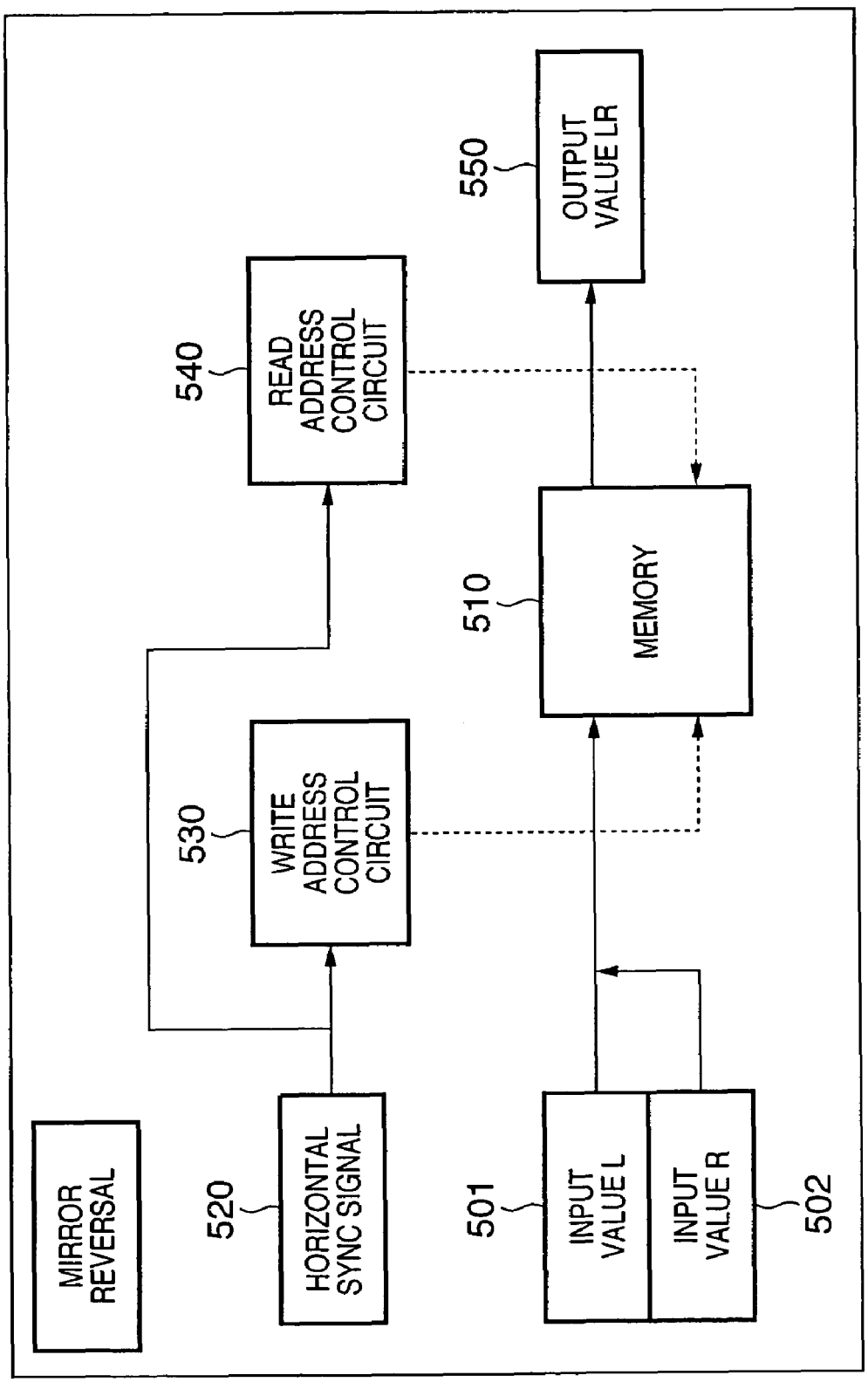
FIG. 7 is a block diagram showing the mirror reversal circuit in the first embodiment.

A detailed circuit arrangement is shown in FIG. 7. Image data input to an L-side input terminal 501 and R-side input terminal 502 are temporarily written in a data memory 510, and then read out from an output terminal 550. At this time, the read and write orders are controlled by a write address control circuit 530 and read address control circuit 540. The write address control circuit 530 and read address control circuit 540 can control addresses in the order shown in FIG. 3 by initializing the circuits 530 and 540 by the horizontal sync signal of an output image from an output terminal 520.

Figure 4:
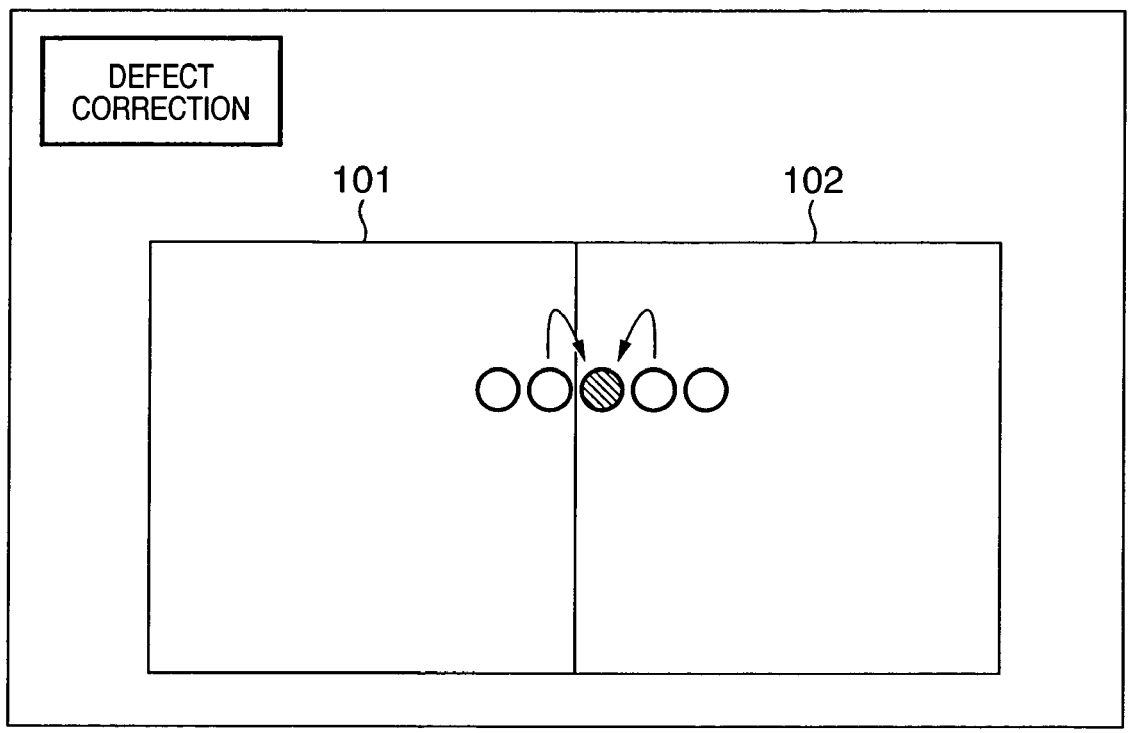
FIG. 4 is a schematic view showing a defect correction method in the first embodiment.

Data having undergone array conversion by the mirror reversal circuit 51 in FIG. 1 so as to process two signals as one image signal is subjected by the defect correction circuit 61 in FIG. 1 to correction of the output defect of an output pixel at a defective portion unique to an individual CCD. FIG. 4 schematically shows a defect correction method in the first embodiment. A given pixel of a natural image is very similar to an adjacent pixel. By using this nature, the difference of a given pixel from an adjacent pixel in the left digital image data 101 and right digital image data 102 of the frame are compared in detection. When the difference is equal to or larger than the threshold, the pixel is determined as a CCD defect. The defective pixel is interpolated using adjacent pixels.

Figure 8:
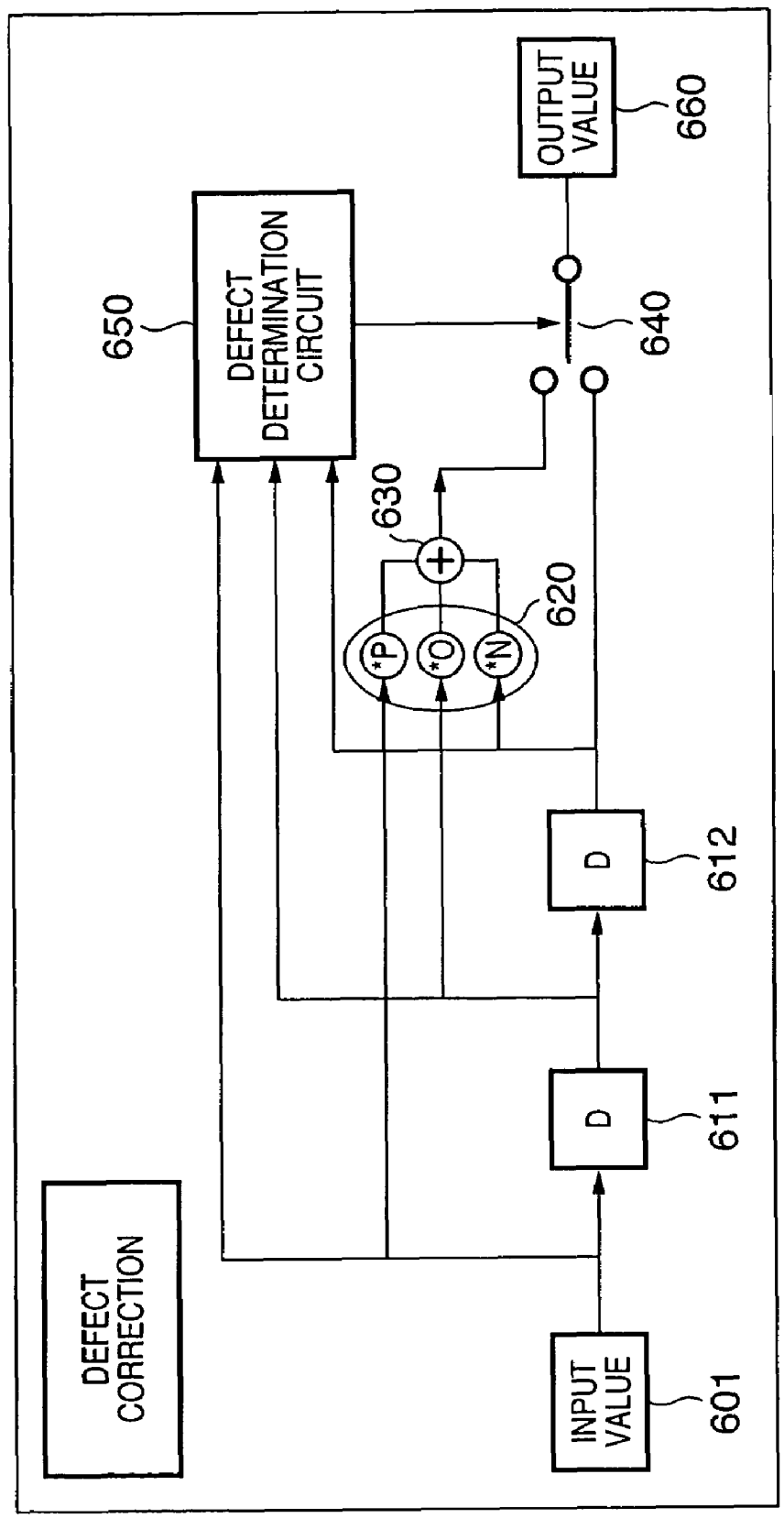
FIG. 8 is a block diagram showing a defect correction circuit in the first embodiment.

A detailed circuit arrangement is shown in FIG. 8. Delay elements are extracted by delay circuits 611 and 612 from image data sequentially supplied to an input terminal 601. The difference from immediately adjacent pixel data is calculated by a defect determination circuit 650, and compared with a preset threshold. When the difference is equal to or larger than the threshold, the pixel is determined as a CCD defect. The defect determination circuit 650 controls a switch 640 upward when the pixel is defective, and downward when the pixel is not defective. That is, for nondefective data, data delayed by the delay circuits 611 and 612 are output to an output terminal 660 through the defect determination circuit 650. For defective data, values obtained by weighting delay elements extracted by the delay circuits 611 and 612 by multipliers 620 are added by an adder 630 to derive an interpolation value and output it to the output terminal 660.

The defect correction circuit 61 in FIG. 1 performs defect correction after the mirror reversal circuit 51 performs array conversion so as to process two signals as one image signal. As a result, even the pixel defect of a pixel adjacent to the boundary between two divided frames at the center of the frame shown in FIG. 4 can be properly corrected.

The operation of the image signal pre-processing circuit block comprised of the blocks 41, 42, 51, and 61 in FIG. 1 has been explained. An image signal having sequentially undergone a series of image signal processes is transferred to the image processing circuit 81. The image signal is subjected to a necessary image process such as an electronic zoom process on the apparatus system side, and then utilized.

Second Embodiment

An image signal processing apparatus according to the second embodiment of the present invention will be described.

Figure 10:
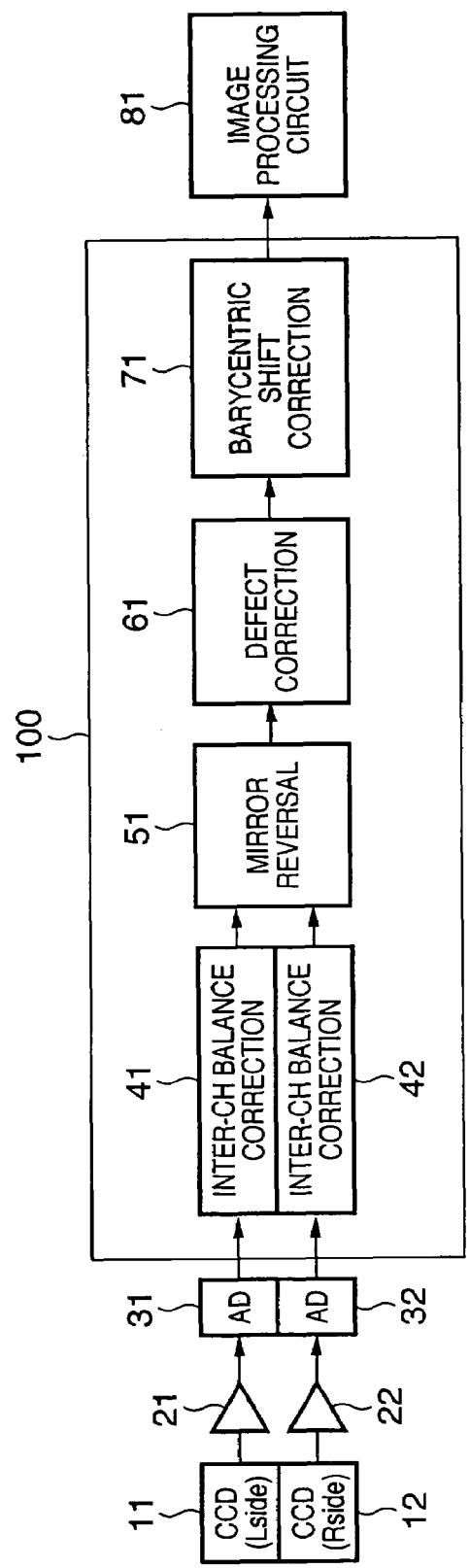
FIG. 10 is a block diagram showing an image signal digital processing apparatus according to the second embodiment of the present invention.

FIG. 10 is a block diagram showing the image signal processing apparatus according to the second embodiment of the present invention. In FIG. 10, reference numerals 11 and 12 denote CCDs which generate and output color image signals. The CCDs 11 and 12 in FIG. 10 are of two-divided output type. The CCD 11 provides an output from the left image area of the frame, and the CCD 12 provides an output from the right image area. The CCD in the second embodiment utilizes, as a moving image, an output from a CCD formed by a primary color Bayer array filter. In a moving image read mode, the CCD executes pixel decimation and output by vertical addition and read of the same color.

Reference numerals 21 and 22 denote amplifiers for amplifying the left and right CCD outputs of the frame. The amplifier 21 amplifies an output from the left image area of the frame, and the amplifier 22 amplifies an output from the right image area. Reference numerals 31 and 32 denote A/D converters for converting the left and right CCD outputs of the frame from analog values into digital values. The A/D converter 31 converts an output from the left image area of the frame, and the A/D converter 32 converts an output from the right image area. Reference numerals 41 and 42 denote inter-channel balance correction circuits for correcting the output balance between the left and right CCD outputs of the frame.

A two-divided output type CCD such as the CCDs 11 and 12 is advantageous in read speed, but disadvantageous in output level matching. Thus, the left and right outputs of the frame are corrected by the inter-channel balance correction circuits 41 and 42. Reference numeral 51 denotes a mirror reversal circuit for performing array conversion so as to process two divided output signals as one image signal by subsequent circuits.

Reference numeral 61 denotes a defect correction circuit for correcting an output defect of an output pixel at a defective portion unique to an individual CCD. Reference numeral 71 denotes a barycentric shift correction circuit. In order to use an output from a CCD formed by a primary color Bayer array filter as a moving image, pixel decimation and output by vertical addition and read of the same color are performed in the moving image read mode. In this case, a barycentric shift occurs in the vertical direction of the frame, and an oblique line on the frame does not appear obliquely but is expressed in a staircase pattern. The barycentric shift correction circuit 71 corrects this phenomenon. More specifically, the barycentric shift of a pixel position is corrected by weighted addition together with preceding and succeeding pixels on the same vertical line. The blocks 41, 42, 51, 61, and 71 form a block 100 representing an image signal processing circuit in the second embodiment. An image signal having undergone a series of image signal processes is transferred to an image processing circuit 81, subjected to a necessary image process such as an electronic zoom process on the apparatus system side, and then utilized.

The block arrangement of the second embodiment is very similar to that of the first embodiment. The difference between the block arrangements of the second and first embodiments is the presence/absence of the barycentric shift correction circuit 71 in FIG. 10. The barycentric shift correction circuit 71 in FIG. 10 is necessary because a barycentric shift occurs in the vertical direction of the frame when pixel decimation and output by vertical addition and read of the same color are performed in the moving image read mode in order to use an output from a CCD formed by a primary color Bayer array filter as a moving image. In the second embodiment, the barycentric shift correction circuit is indispensable.

In FIG. 10 showing the arrangement of the second embodiment, the operations of the blocks 11, 12, 21, 22, 31, 32, 41, 42, 51, and 61 are the same as those in the first embodiment, and a description thereof will be omitted.

Data having undergone correction of the output defect of an output pixel at a defective portion unique to an individual CCD by the defect correction circuit 61 in FIG. 10 is subjected to correction of the above-mentioned phenomenon by the barycentric shift correction circuit 71 in FIG. 10. That is, when pixel decimation and output by vertical addition and read of the same color are performed in the moving image read mode in order to use an output from a CCD formed by a primary color Bayer array filter as a moving image, a barycentric shift occurs in the vertical direction of the frame, and an oblique line on the frame does not appear obliquely but is expressed in a staircase pattern.

Figure 5:
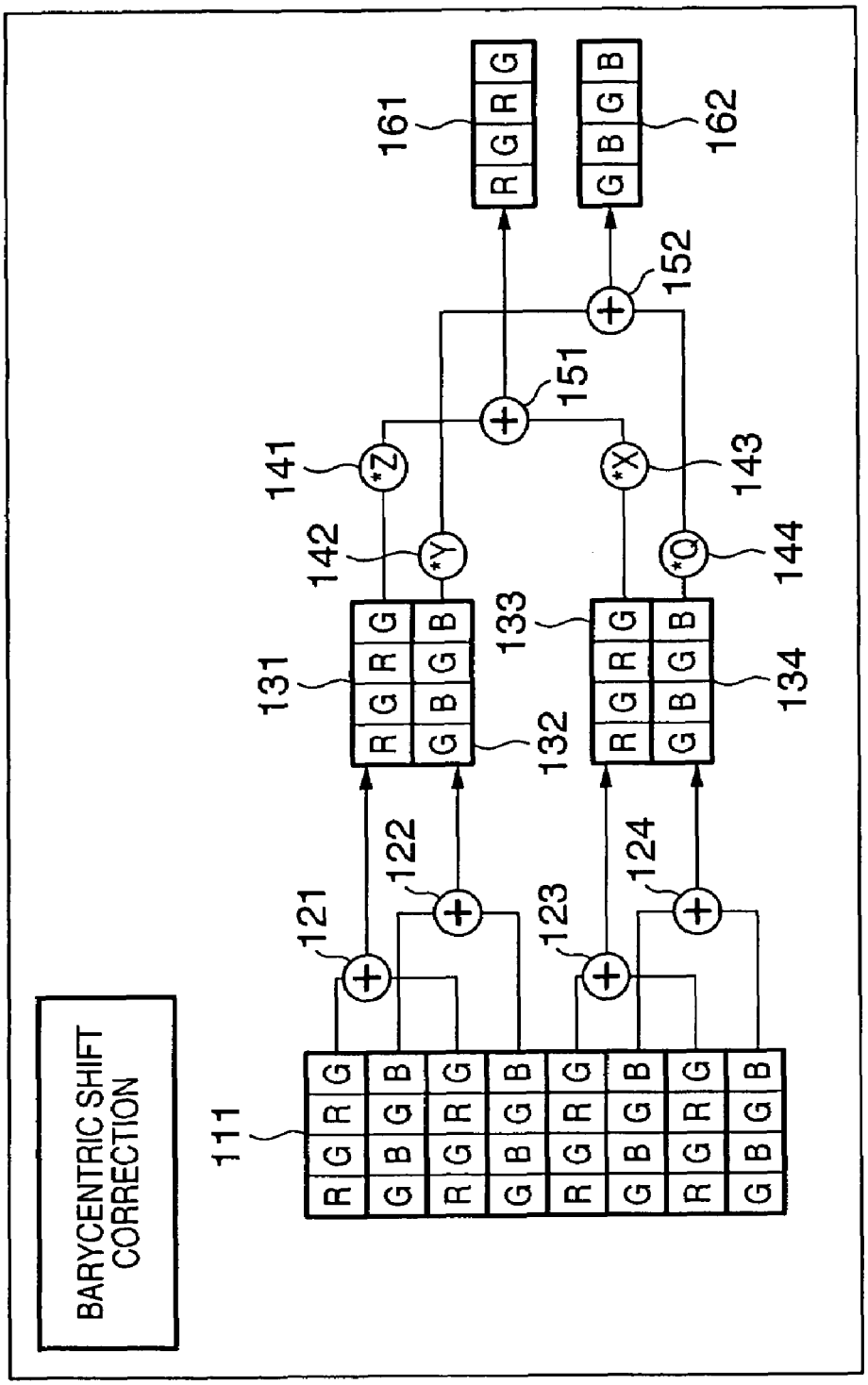
FIG. 5 is a schematic view showing a barycentric shift correction method in the second embodiment.

FIG. 5 schematically shows a barycentric shift correction method in the second embodiment. CCD data 111 of the primary color Bayer array shown in FIG. 5 is read out by decimating the number of pixels to ½ by vertical addition and read of the same color. This solves a problem in the moving image processing speed. In vertical addition of the same color, charges of two image sensing elements of the same color adjacent in the vertical direction are simultaneously transferred to one vertical transfer CCD and added. This method can be implemented by devising the electrode arrangement of the CCD. Adders 121, 122, 123, and 124 in FIG. 5 mean addition of two pixels of the same color adjacent in the vertical direction on the vertical transfer CCD.

Data on a row covered with "R (red)", "G (green)", "R", and "G" filters are added on the vertical transfer CCD to data on every third row covered with "R", "G", "R", and "G" filters. An "R"&"G" data string added by the adder 121 is output as a data string 131 to a CCD output terminal. Similarly, data on a row covered with "G", "B (blue)", "G", and "B" filters are added on the vertical transfer CCD to data on every third row covered with "G", "B", "G", and "B" filters. A "G"&"B" data string added by the adder 122 is output as a data string 132 to a CCD output terminal.

In this CCD filter arrangement, pixels on every third rows are added by vertical addition of the same color. Adjacent data mean pixels on every fourth row, and data strings 133 and 134 respectively form an "R"&"G" data string after adding adjacent data and a "G"&"B" data string after adding data. That is, the data strings 131, 132, 133, and 134 in FIG. 5 are input to the barycentric shift correction circuit 71 in FIG. 10.

The physical arrangement of the data strings 131, 132, 133, and 134 after vertical addition of the same color will be considered. These data strings are obtained by adding physically arranged pixels such as the CCD data 111. When the pixels of the CCD data 111 are added, the barycentric position is located near the center of addition elements of the same color on the pixel string of the CCD data 111. Thus, row groups each of two successive rows such as a row group of the data strings 131 and 132 and a row group of the data strings 133 and 134 are formed every fourth rows with reference to the original four rows of the pixel strings of the CCD data 111, and no row group at an equal interval is formed every other row. This is a barycentric shift. The barycentric shift is a cause for the phenomenon in which an oblique line on the frame does not appear obliquely but is expressed in a staircase pattern. The barycentric shift undergoes vertical interpolation filtering by multipliers 141, 142, 143, and 144 and adders 151 and 152. As a result, row groups 161 and 162 in FIG. 5 are generated at equal intervals every other row.

Figure 9:
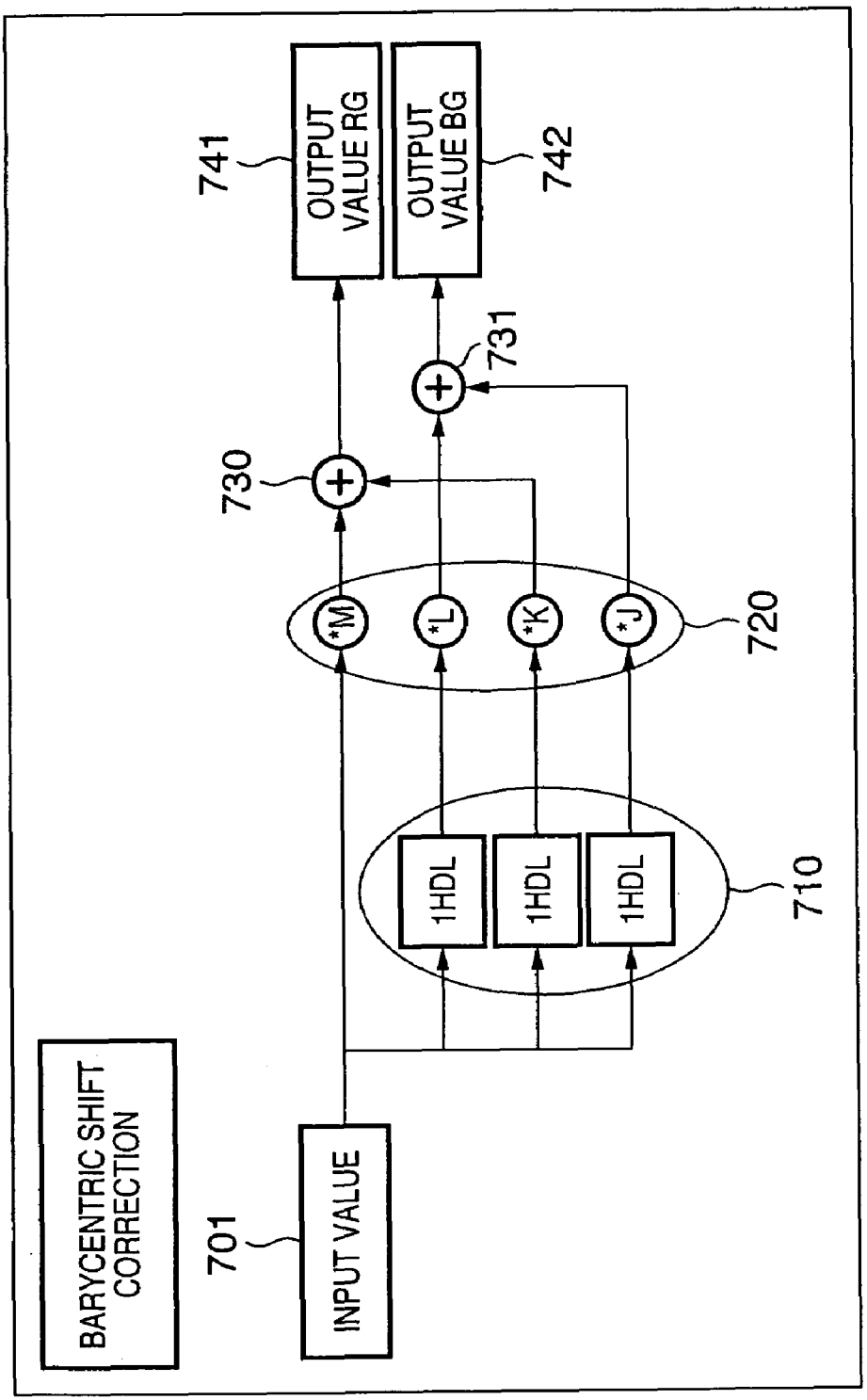
FIG. 9 is a block diagram showing a barycentric shift correction circuit in the second embodiment.

A detailed circuit arrangement is shown in FIG. 9. Adjacent horizontal line elements are extracted by 1H (horizontal scanning period) delay circuits 710 from image data sequentially supplied to an input terminal 701. Adjacent horizontal line elements undergo weighted multiplication by multipliers 720 so that row groups are generated at equal intervals every other row. The results of adding elements of the same colors by adders 730 and 731 into "R"&"G" data and "G"&"B" data are output to an "R"&"G" data string output terminal 741 and "G"&"B" data string output terminal 742, thereby completing barycentric shift correction.

In the barycentric shift correction process, original input data is converted by performing coefficient multiplication and weighted addition for each pixel data, and a new calculation value is output. If the barycentric shift correction process is executed before the process of the defect correction circuit 61 in FIG. 10, processed data is input to the defect correction circuit 61 without inputting any defective raw data. This makes it very difficult to detect a defect. However, the arrangement of FIG. 10 can execute the defective data interpolation process without this drawback.

As described above, an image signal digital processing apparatus which performs a pre-process in order to input, to a subsequent image processing circuit, an A/D-converted digital output signal from a CCD having a structure "the image sensing area of the CCD is divided into a plurality of areas and signals are output from the divided areas" is characterized by comprising a means for performing a signal process by first comparing a plurality of input signals and performing a correlation correction process in accordance with the comparison result, then controlling the read order of a plurality of image signals having undergone the correlation correction process and rearranging data into the array of an actual monitoring screen to synthesize a plurality of images into one image, and finally comparing a rearranged pixel with preceding and succeeding pixels on the same horizontal line and interpolating the pixel signal by the preceding and succeeding pixels on the same horizontal line in accordance with the comparison result to interpolate a CCD pixel defect. This arrangement greatly reduces the physical circuit size.

Another image signal digital processing apparatus which performs a pre-process in order to input, to a subsequent image processing circuit, an A/D-converted digital output signal from a CCD having a structure in which "in a moving image read mode, an output signal from an RGB primary color CCD undergoes pixel decimation and output by vertical addition and read of the same color" and "the image sensing area of the CCD is divided into a plurality of areas and signals are output from the divided areas" is characterized by comprising a means for performing a signal process by first comparing a plurality of input signals and performing a correlation correction process in accordance with the comparison result, then controlling the read order of a plurality of image signals having undergone the correlation correction process and rearranging data into the array of an actual monitoring screen to synthesize a plurality of images into one image, further comparing a rearranged pixel with preceding and succeeding pixels on the same horizontal line and interpolating the pixel signal by the preceding and succeeding pixels on the same horizontal line in accordance with the comparison result to interpolate a CCD pixel defect, and finally weighting and adding the CCD pixel defect-interpolated signal together with the preceding and succeeding pixels on the same vertical line to correct the physical barycentric shift of the pixel position that is caused by vertical addition and read of the same color. This arrangement greatly reduces the physical circuit size.

Still another image signal digital processing apparatus which performs a pre-process in order to input, to a subsequent image processing circuit, an A/D-converted digital output signal from a CCD having a structure in which "the image sensing area of the CCD is divided into a plurality of areas and signals are output from the divided areas" is characterized by comprising a means for performing a signal process by first comparing a plurality of input signals and performing a correlation correction process in accordance with the comparison result, and then controlling the read order of a plurality of signals having undergone the correlation correction process and rearranging data into the array of an actual monitoring screen to synthesize a plurality of images into one image. This arrangement greatly reduces the physical circuit size of the correlation correction processing circuit.

Still another image signal digital processing apparatus which performs a pre-process in order to input, to a subsequent image processing circuit, an A/D-converted digital output signal from a CCD having a structure in which "the image sensing area of the CCD is divided into a plurality of areas and signals are output from the divided areas" is characterized by comprising a means for performing a signal process by first controlling the read order of a plurality of image signals having undergone a correlation correction process and rearranging data into the array of an actual monitoring screen to synthesize a plurality of images into one image, and then comparing a rearranged pixel with preceding and succeeding pixels on the same horizontal line and interpolating the pixel signal by the preceding and succeeding pixels on the same horizontal line in accordance with the comparison result to interpolate a CCD pixel defect. Consequently, even the pixel defect of a pixel adjacent to the boundary between a plurality of image sensing areas can be sufficiently corrected.

Still another image signal digital processing apparatus which performs a pre-process in order to input, to a subsequent image processing circuit, an A/D-converted digital output signal from a CCD having a structure in which "in a moving image read mode, an output signal from an RGB primary color CCD undergoes pixel decimation and output by vertical addition and read of the same color" and "the image sensing area of the CCD is divided into a plurality of areas and signals are output from the divided areas" is characterized by comprising a means for performing a signal process by first comparing a rearranged pixel with preceding and succeeding pixels on the same horizontal line and interpolating the pixel signal by the preceding and succeeding pixels on the same horizontal line in accordance with the comparison result to interpolate a CCD pixel defect, and then weighting and adding the CCD pixel defect-interpolated signal together with the preceding and succeeding pixels on the same vertical line to correct the physical barycentric shift of the pixel position that is caused by vertical addition and read of the same color. Hence, a defect can be accurately detected.

Note that the above embodiments are merely examples how the present invention can be practiced, and the technical scope of the present invention should not be restrictedly interpreted by the embodiments. In other words, the present invention can be practiced in various ways without departing from the technical concept and main features of the invention.

As has been described above, the above embodiments can greatly reduce the physical circuit size by digitally performing a process of converting the image signals of divided areas output from an image sensing means into digital values and then correcting the balance between the image signals of the divided areas, a process of synthesizing the image signals of the divided areas, and/or a process of correcting a defect of the image signal.

As many apparently widely different embodiments of the present invention can be made without departing from the spirit and scope thereof, it is to be understood that the invention is not limited to the specific embodiments thereof except as defined in the appended claims.

What is claimed is:

1. An image signal processing apparatus comprising:
an image sensor which has an image sensing area divided into a left side area and a right side area each of which has a plurality of pixels;
a first A/D converter which converts signals of pixels included in the left side area to digital signals;
a second A/D converter which converts signals of pixels included in the right side area to digital signals;
a balance correction device which compares digital signals of the pixels included in the left side area output from said first A/D converter and digital signals of the pixels included in the right side area output from said second A/D converter, and corrects a level difference between the two digital image signals of the left side area and the right side area;
a synthesis device which synthesizes the digital image signals of the left side area and the right side area, whose level difference has been corrected, to form one image data; and
a defect correction device which detects a pixel whose signal difference from an adjacent pixel is not less than a threshold value as a defective pixel and corrects the defective pixel in the image data synthesized by said synthesis device,
wherein the signals of the pixels included in the left side area output from said balance correction device are input to said synthesis device from a left side pixel towards a right side pixel and the signals of the pixels included in the right side area output from said balance correction device are input to said synthesis device from a right side pixel towards a left side pixel, the input operation of the signals of the pixels of the right and left side areas being performed in parallel, and
wherein said synthesis device outputs the signals of the pixels included in the left side area from the left side pixel towards the right side pixel and thereafter said synthesis device outputs the signals of the pixels included in the right side area from the left side pixel towards the right side pixel with respect to each line of said image sensor.

2. The apparatus according to claim 1, further comprising a barycentric shift correction device,
wherein said image sensor outputs image signals, each of which is added in vertical direction in each of the left and right side areas, from a first amplifier and a second amplifier, and
wherein said barycentric shift correction device corrects a barycentric shift of a pixel position in the image data corrected by said defect correction device, that is caused by vertical addition of a same color, by weighted addition together with preceding and succeeding pixels on a same vertical line after correction by said defect correction device.

* * * * *